United States Patent Office 3,687,726
Patented Aug. 29, 1972

3,687,726
ALUMINA COATED CHROMIUM DIOXIDE
Donald George Pye, Wilmington, Del., assignor to E. I. du Pont de Nemours and Company, Wilmington, Del.
No Drawing. Filed Oct. 19, 1970, Ser. No. 82,117
Int. Cl. H01f 1/00, 10/02
U.S. Cl. 117—234
2 Claims

ABSTRACT OF THE DISCLOSURE

Ferromagnetic chromium dioxide is stabilized with a coating of alumina.

BACKGROUND OF THE INVENTION

Field of the invention

This invention concerns ferromagnetic chromium dioxide stabilized by a novel protective coating of alumina and methods of producing the coating.

Description of the prior art

Chromium dioxide is a crystalline ferromagnetic solid which, under some conditions, especially in the presence of moisture, may react with oxidizable organic and inorganic substances, forming nonmagnetic, lower-valent chromium compounds. Chromium dioxide reacts slowly with water to form nonmagnetic $CrO(OH)$ and $CrO_3$ at a rate dependent inter alia, upon temperature. Conversion of the dioxide to nonmagnetic material (degradation) may be detrimental in use applications, for example, when the dioxide is the magnetic component of recording tapes.

A method of stabilizing chromium dioxide by surface reduction is described in assignee's patent to Bottjer and Ingersoll, U.S. 3,512,930, issued May 19, 1970. This procedure results in some loss in saturation magnetization and increase in coercivity. Application of protective coatings of aluminum phosphate without degradation of the oxide is described in assignee's copending application, Balthis, Ser. No. 880,299, filed Nov. 26, 1969.

Many materials that might be expected to function effectively as protective coatings fail because they reduce the oxide or become dislodged during fabrication of the coated particles into useful commodities. It is an object of this invention to provide a new method for reducing the rate of reaction of chromium dioxide with water and with organic materials, e.g., of the type used as binders and cross-linking agents in magnetic tape. A second object is to provide economically attractive methods of producing protective coatings with little or no degradation of the oxide during application of the coatings. A third object is to provide a thin protective coating over substantially the entire surface of the chromium dioxide particles, leaving few uncoated areas available for subsequent chemical attack. Still another object is to provide a coating that is resistant to fracture or attrition and which will not flake off during subsequent processing, e.g. during the milling or grinding required to disperse the particles during preparation of magnetic tape. Both alumina-coated $CrO_2$ and the application of alumina coatings to fine ferromagnetic particles are new.

SUMMARY OF THE INVENTION

In describing this invention, "$CrO_2$," "chromium dioxide," "chromium oxide," "ferromagnetic chromium dioxide," and "ferromagnetic $CrO_2$" are employed interchangeably and it is to be understood that the material referred to, like many inorganic oxides, may exhibit small deviations from the exact stoichiometry required for the formula $CrO_2$, e.g., small stoichiometric excesses or difficulties of oxygen.

The product of this invention consists of particulate, coated ferromagnetic chromium dioxide having improved stability in water and/or in organic media, said product comprising ferromagnetic chromium dioxide particles substantially uniformly coated with 1 to 20% by weight of $Al_2O_3 \cdot xH_2O$ wherein $x$ is 0–3. The term "alumina" is construed to mean both hydrated and anhydrous forms of aluminum (III) oxide.

A preferred ferromagnetic chromium dioxide composition having improved stability in magnetic recording media comprises a substrate of chromium dioxide having an intrinsic coercive force above 200 oersteds, a saturation induction in the range of 80–100 gauss-cm.$^3$/g., and a remanence ratio of at least 0.35, said ferromagnetic chromium dioxide being in the form of highly uniform, fine acicular particles of a tetragonal crystal structure of the rutile type ranging up to 1.5 microns in length, and having a median axial ratio ranging from 2:1 to 20:1, essentially all of which particles constitute single magnetic domains, said chromium dioxide substrates having a surface coating of alumina extending over substantially all the surface of the chromium dioxide particles and said alumina being present in a concentration of about 1 to 20% by weight of the chromium dioxide particles.

Any particular form of ferromagnetic chromium oxide may be coated by the procedures of this invention. The preformed, particulate ferromagnetic chromium oxides may, if desired, contain modifiers well known in the art. Suitable chromium oxides for use as starting materials in the present invention include, for example, those disclosed in U.S. Pats. 2,885,365, 2,923,683, 2,923,684, 2,923,685, 2,956,955, 3,034,988, 3,068,176, 3,117,093 and 3,278,263. These materials may exhibit a wide range of chemical, physical, and magnetic properties. For example, they may be relatively coarse, largely polydomain particles with average lengths of 10 microns or more, or they may be highly acicular, single domain particles with lengths no greater than 1.5 microns and median axial ratios as high as 20:1 or more. Similarly, surface area may range from 0.8–0.9 m.$^2$/g. to 30 m.$^2$/g. or more, and intrinsic coercive force may be from 40–50 oersteds to above 200 oersteds. Thus, the suitable materials may represent at least a 30-fold range in surface area, a range of at least 10-fold in particle length, and at least a 5-fold range in intrinsic coercive force.

The coating procedures of the present invention are also applicable to chromium dioxide which has been stabilized by reductive surface treatment as described in assignee's Bottjer and Ingersoll patent cited above. As taught in that patent, any compound that is a reducing agent for a metal oxide and that has a standard oxidation potential in acidic media greater than about $-1.5$ volts will serve to stabilize the surface of chromium dioxide by surface reduction. The stabilizing alumina coatings of this invention may be applied also to chromium dioxide whose magnetic properties have been upgraded by thermal treatment under oxidizing conditions as described in assignee's copending application Bottjer and Cox, Ser. No. 705,029, filed Feb. 13, 1968, U.S. Pat. 3,529,930. Except as they influence the achievement of satisfactory dispersion, the initial magnetic properties of the chromium dioxide have little effect upon the coating operation.

As initially precipitated, the alumina coating normally consists of hydrous alumina, i.e., $Al_2O_3 \cdot xH_2O$ wherein $x$ is greater than zero but not more than 3. Dehydration, with reduction in the value of $x$ takes place during subsequent processing, specially during the "upgrading," i.e., heat-treating, procedure described hereinafter. The alumina coatings are produced by slurrying chromium dioxide particles in water, in a solution of an aluminum-containing salt, in an acid, or in a base, and adding with agitation in any order, sequentially or simultaneously, a solution of at least one of an aluminum-containing salt, an acid, or a base in sufficient quantity to control, that is, establish and maintain, the pH of the slurry in the range of 4 to 10 to thereby precipitate alumina onto the individual chromium dioxide particles. It is to be understood that the above steps always include the use of the aluminum salts and that the aluminum of the aforesaid aluminum-containing salt may be in cationic form (as, for example, in $AlCl_3$ and $Al(NO_3)_3$) or in anionic form (as, for example, in alkali metal aluminates). Suitable acids are those which form water-soluble aluminum salts, e.g., hydrochloric, nitric, acetic, or sulfuric acid. It will be obvious that the solutions should not contain ions which, when combined with the solution containing the soluble aluminum salt, will predominantly produce extraneous precipitates in addition to the desired $$Al_2O_3 \cdot xH_2O$$

Acids such as phosphoric acid, which precipitate water-insoluble aluminum salts, are generally not suitable. Other solutions may or may not be suitable depending upon the nature of the aluminum salt. For example when the soluble aluminum salt is $AlCl_3$, the use of a solution of $Ca(OH)_2$ is permissible; however when the aluminum salt is $Al_2(SO_4)_3$ the use of $Ca(OH)_2$ is not generally desired because of the precipitation of extraneous $CaSO_4$ which might interfere with the proper deposition of $Al_2O_3 \cdot xH_2O$ on the $CrO_2$ particles.

Once the $CrO_2$ is slurried in water it is preferred to add the alumina-precipitating reactants within a short time in order to minimize the degradation of the uncoated $CrO_2$. This is especially true when the $CrO_2$ is slurried in alkaline solutions which attack the uncoated $CrO_2$ more rapidly than neutral or mildly acid solutions.

Coating may be effected at any temperature above the freezing point, e.g., at 0 to 100° C., but temperatures between about 20 and 70° C. are preferred, primarily because of convenience and production of superior coatings. Slurries of freshly coated chromium dioxide may be digested for any desired period, e.g., for five minutes to 60 minutes or more to ensure equilibration and possibly to effect partial dehydration of the hydrous alumina coating.

The coated particles may be separated from the medium in which the coating is effected by a variety of known techniques, e.g., by filtration or by magnetically-promoted settling, followed by washing and drying. Drying may be promoted by rinsing the particles with a low-boiling, water-miscible solvent such as acetone. Drying may be completed in air or in vacuo, preferably at 0–80° C. Higher temperatures, up to about 150° C., may be used provided the rate of removal of water is rapid, as for example, by spray drying, to avoid excessive hydrolysis of the $CrO_2$.

A preferred step in preparing alumina-coated chromium dioxide is to heat the coated particles which have been dried as just described, or even the original water-wet, as coated particles, at temperatures of about 150–245° C., preferably 250–350° C., for 15 minutes to 16 hours or more in air or oxygen. This has two advantages. First, the hydrous alumina coating is at least partially dehydrated and becomes more firmly attached to the $CrO_2$ particles. Second, any deliberately or inadvertently degraded $CrO_2$ is "upgraded" in magnetic properties as described in copending Bottjer and Cox, Ser. No. 705,029, "Process for Improving Ferromagnetic Properties of Chromium Dioxide by Heating in an Oxidizing Environment." "Upgrading" usually results in reduction in coercivity and increase in saturation magnetization and remanence. Since upgrading is possible, it is within the scope of this invention to deliberately pre-reduce the surface of the $CrO_2$ particles to facilitate dispersion of the $CrO_2$ during coating. Various applicable surface reduction procedures are described in the Bottjer and Ingersoll patent.

The time required for upgrading depends upon the oxidizing potential of the environment in which the particles are heated. Longer periods of heating are required in air than in atmospheres of higher oxygen content.

Preferred coating processes comprise:

(A) Slurrying particles of $CrO_2$ in water, adding aluminum in the form of an aqueous solution of a soluble aluminum salt, adding a water-soluble base at a controlled rate until a pH of about 4.5 to 8 is attained whereby alumina is precipitated upon the chromium dioxide particles, and then isolating and preferably drying the coated particles. Optionally the coated particles may be heated in air or oxygen at 250–350° C. for about 0.25–16 hours or more.

(B) Slurrying $CrO_2$ in water, adding simultaneously with stirring
 (1) an aqueous solution of aluminum in the form of (a) a soluble aluminum salt or (b) an alkali metal aluminate, and (2) an aqueous solution of a water-soluble base or acid as the nature of the aluminum compound may dictate, at a controlled rate such that pH is maintained between about 4.5 and 8, isolating and preferably drying the coated particles. The coated particles may then be heated at 250–350° C. for about 0.95–16 hours or more.

SPECIFIC EMBODIMENTS OF THE INVENTION

The method of carrying out this invention may be understood from the following more detailed description. Material quantities are in parts by weight and are based on 100 parts of $CrO_2$.

Method A

When the mode of precipitating alumina onto the $CrO_2$ particles involves sequential addition of reactants, 0.5–20 parts of aluminum in the form of a soluble aluminum salt, e.g., $Al(NO_3)_3 \cdot 9H_2O$, preferably dissolved in 10–1000 parts of water, is added before, during, or after slurrying 100 parts of $CrO_2$ in 25–2500 parts of water. If not directly prepared therein, the slurry is placed in a reactor equipped with an agitator and preferably having means for controlling temperature, e.g., a jacket through which preheated or cooled water may be circulated. The temperature is adjusted to between 0 and 100° C., preferably between 20 and 70° C., and the slurry stirred by an externally driven paddle or shearing-type agitator at a speed that insures good mixing. Temperature and pH are followed throughout the coating operation.

A solution of 0.5 to 100 parts of a water-soluble base, e.g., NaOH, in 10 to 1000 parts of water is added slowly at controlled rate until the pH has risen to the desired value in the range of about 4.5 to 8. The quantity of basic solution added depends upon its concentration and the quantity and identity of the aluminum salt used.

The slurry may then be digested with continued stirring at the treatment temperature for 5 to 60 minutes or longer to insure equilibration of the hydrous alumina coating. The coated particles are separated from the mother liquor by filtering or other means and washed free of soluble byproducts, e.g., on the filter or by repeated slurrying in water. Drying may be accelerated by rinsing with acetone. Drying is completed in static or in flowing air or in vacuo. The coated $CrO_2$ may be upgraded by heating it in air or oxygen at 150 to 425° C., preferably 250–350° C., for 0.25 to 30 hours or more.

In Method A any water-soluble cationic aluminum salt (e.g. aluminum nitrate, aluminum sulfate or aluminum chloride) and any water-soluble base (e.g., KOH, LiOH, $Na_2CO_3$, $NH_4OH$ or gaseous $NH_3$) may be used. It will be apparent that the order of addition of reactants may be reversed, i.e., the base may be added first and the aluminum salt second. It will also be obvious that any water-soluble metal aluminate, e.g., an alkali metal aluminate, may be used in which case precipitation of alumina is effected by adding an acid.

Method B

Another way of forming the coating of alumina involves simultaneous addition of reactants to an aqueous slurry of $CrO_2$. The advantages of this procedure are that the relative concentrations of reactants can be easily varied, the ionic strength of the system is minimized with improvement in particle dispersion, and pH can be controlled closely at any desired level or sequence of levels. An aqueous $CrO_2$ slurry (100 parts of $CrO_2$ in about 250 to 5,000 parts of water) is placed in a reactor equipped for temperature control and agitation as described, stirring is begun and temperature is adjusted to between 0 and 100° C., preferably between 20 and 70° C. It may happen that the slurry as first prepared may be either very acidic or very alkaline. In such case it may be desirable to bring the pH of the slurry closer to the pH range of 4–10 before the solution of the aluminum salt and the solution of the requisite acid or base are added to the slurry. Following such initial pH adjustment, if performed, (1) 10 to 1000 parts of an aqueous solution of 0.5 to 50 parts of aluminum in the form of a soluble aluminum salt, e.g., $Al(NO_3)_3 \cdot 9H_2O$, or a soluble metal aluminate, e.g., sodium aluminate, and (2) an aqueous solution of 0.5 to 100 parts of the requisite acid or base, e.g., $HNO_3$ or $NaOH$, in 10 to 100 parts of water, are added simultaneously at rates such that the pH is maintained between 4.5 and 8.

The product is washed, dried and heat-treated (if desired) as described previously.

In coating processes utilizing simultaneous addition of reactants, any soluble aluminate (e.g., sodium aluminate, potassium aluminate) or any water-soluble aluminum salt (e.g., aluminum nitrate, aluminum chloride, aluminum sulfate, aluminum acetate) may be used, and any water-soluble base or acid whose ions do not form extraneous insoluble compounds may be used. It will be understood that one reactant may be in excess of another during addition, and that addition of any reactant may be begun before addition of others is commenced.

It will be apparent that aqueous acids or bases may be added before or during precipitation of alumina to adjust pH to desired levels. Although the initial pH of the solution may vary widely, very little if any alumina is precipitated at a pH below 4 or above about 10.

The concentration of $CrO_2$ in slurries during coating is not highly critical, though it is important that sufficient water be used to give adequate fluidity for efficient mixing as the reactants are added. If excessive viscosity develops, additional quantities of water may be added. On the other hand, extreme dilutions are unnecessary and wasteful. The concentration of the aluminum-containing, acidic, and basic solutions may vary considerably without detriment to the reaction. It will also be appreciated that any reactant may be in excess at the conclusion of the precipitation.

The various steps in purifying the coated products are not critical and relate only to the practical matters of isolating a product from its mother liquor.

Alumina-coated $CrO_2$ may be characterized in a variety of ways. Weight percent of aluminum may be determined analytically, and the physical character of the coating may be determined from electron photomicrographs and by surface area measurements. Coatings thicknesses up to 0.01–0.02 micron or more may be obtained, the exact thickness depending upon properties desired of the product.

Magnetic properties are important in characterizing the coated particles and as indicators of their utility. Particularly important are the intrinsic coercive force ($H_{ci}$), the saturation per gram ($\sigma_s$), the retentivity or remanence per gram ($\sigma_r$), and the ratio of remanence to saturation magnetization ($\sigma_r/\sigma_s$). The sigma values employed herein are defined on pages 5–8 of Bozorth's "Ferromagnetism," D. Van Nostrand Company, New York (1951), and are determined in a field of 4,400 oersteds on apparatus similar to that described by T. R. Bardell, "Magnetic Materials in the Electrical Industry," Philosophical Library, New York (1955), pages 226–228. The sigma values are expressed as gauss cm.$^3$/g. or its mathematical equivalent, emu./g. The definition of intrinsic coercive force ($H_{ci}$) is given in Special Technical Publication No. 85 of the American Society of Testing Materials entitled "Symposium on Magnetic Testing" (1948), pages 191–198. Values of intrinsic coercive force given herein are determined on a DC ballistic type apparatus which is a modified form of the apparatus described by Davis and Hartenheim in the Review of Scientific Instruments 7, 147, (1936). For convenience, magnetic data will be reported as $H_{ci}/\sigma_s/\sigma_r$.

From data of this type it is apparent that coating $CrO_2$ with alumina has little or no degrading effect upon the magnetic properties of the oxide. The measured difference in magnetic properties is accounted for by the amount of magnetically inert alumina. This fact is demonstrated by comparing the properties of alumina-coated $CrO_2$ after heat treatment in an oxygen-containing atmosphere to drive off water in the coating with the properties of the original, uncoated $CrO_2$. Thus, a sample of uncoated $CrO_2$ had an $H_{ci}/\sigma_s/\sigma_r$ of 490/83.8/40.2. After coating with alumina (1.8% Al by analysis) and heating in a stream of oxygen for 19 hours at 330° C., the $H_{ci}/\sigma_s/\sigma_r$ was 475/80.4/38.2. When $\sigma_s$ is corrected for the non-magnetic alumina associated with the $CrO_2$, a $\sigma_s$ of 83.2 emu./g. is calculated, which is nearly the same as the original $\sigma_s$.

In addition to the dehydrating reaction which develops a hard layer, resistant to removal and attrition during subsequent processing, heat-treatment of coated $CrO_2$ is particularly advantageous since any degraded oxide is reconverted to $CrO_2$.

Chromium dioxide reacts slowly with water at a rate dependent upon time, temperature and particle size. The rate of reaction may be measured in a simple water test, and the measured rate affords an indication of whether a coating operation has been successful. The reaction may be represented by the equation $$3CrO_2 + H_2O \rightarrow CrO_3(\text{soluble}) + 2CrO(OH)(\text{insoluble})$$

In this test, 0.5 g. of oxide in 15 cc. of distilled water in a one-ounce, capped bottle is slowly tumbled at room temperature for 16 hours. The bottle and contents are then placed in an oven at 65° C. The extent of reaction is determined periodically by comparing the depth of chromic acid color that develops in the supernatant with that of solutions of known CrO content.

A typical sample of uncoated $CrO_2$ having a surface area of 14.9 m.$^2$/g. developed a color equivalent to 15% reaction, sometimes referred to as degradation, in about 330 hours.

Rate of reaction is related to surface area as shown by the following data:

| Surface area in square meters/gram: | Hours required for 15% decomposition |
|---|---|
| 0.8–0.9 | >1000 |
| 14.9 | 330 |
| 22.5 | 72 |

A more definitive test of the protective value of coatings is the stability of the coated oxide in magnetic tape. Two procedures, designated below as Tape Procedure A and Tape Procedure B, were used in preparing tapes for test.

Tape Procedure A

A mixture of 0.4–0.6 g. of "Alcolec" (a soya lecithin purchasable from American Lecithin Company) or 0.6–1.0 g. of a low molecular weight methyl methacrylate/2-methyl-5-vinylpyridine polymer of approximately 90/10 by weight composition (described in copending application, Proskow U.S. Ser. No. 832,080, filed June 11, 1969), 30–50 cc. tetrahydrofuran, 10.0–12.0 g. chromium oxide, and about 50–110 g. clean Ottawa sand, 20–30 mesh, is placed in a 125 cc. beaker and milled for 45–60 min. with external cooling using a disc-shaped stirrer about 1.5 in. in diameter operating at 1000–1200 r.p.m. Filtration and film casting are as described hereinafter for dispersions containing 10 g. of chromium oxide.

If 10.0 g. of chromium oxide is used, 18.1 g. of polymer solution equivalent to a mixture of (a) 1.80 g. of a commercially available polyester-polyurethane resin based on diphenylmethane, adipic acid, and an alkanediol having 2–4 carbon atoms in a 15 weight percent solution in tetrahydrofuran and (b) 1.80 g. of commercially available poly(vinylidene chloride/acrylonitrile) of about 80/20 weight percent composition as a 30 weight percent solution in 4-methyl-2-pentanone, is then added to the slurry. If 12.0 g. of chromium oxide is used, 15.2 g. of a 15% solution of polyester-polyurethane resin in tetrahydrofuran and 7.6 g. of a 30% solution of poly(vinylidene chloride /acrylonitrile) in acetone or 4-methyl-2-pentanone are used. Stirring is continued for an additional 0.5 hour. The slurry is forced through a 2–5 micron filter, optionally covered with a 1-cm. layer of 180–240 mesh sand, to remove sand used in effecting dispersion. The viscosity of the filtered dispersion of alumina-coated $CrO_2$ is adjusted, if necessary, to about 5–10 poises by adding tetrahydrofuran or by evaporating solvent.

The dispersion is then cast, using a doctor knife set at 3-mil clearance, onto a 1.5-mil poly(ethylene terephthalate) film temporarily attached to a glass plate, and the coated film is passed between opposing magnets to orient the ferromagnetic particles before the dispersion dries. After drying, the tapes are stripped from the glass support, optionally calendered at about 105° C. and 1100 p.l.i. by passing them between heated rolls, and then tested under accelerated aging conditions (as explained hereinafter) to determine the degree of stabilization afforded by the alumina coating.

Tape Procedure B

A mixture of 319 g. of 20–30 mesh Ottawa sand, 30.0 g. of chromium oxide, 6.20 g. of low molecular weight poly(methyl acrylate/2-methyl-5-vinyl pyridine, 84/16), 0.09 g. of stearamide and 50 cc. of tetrahydrofuran (THF) is placed in an externally cooled beaker. The mixture is milled for about 40 minutes with an impeller consisting of 2 disks about 2.5 inches in diameter and about 1 inch apart, driven by a high speed motor. During milling, additional THF is added as necessary to maintain workable consistency (up to 40 cc. may be required). A 53.6 g. quantity of 15 weight percent polyester-polyurethane resin (see Procedure A) in THF and 0.54 g. of 2,4-toluene diisocyanate/trimethylolpropane (about 3/1) crosslinking agent are added and the mixture is milled an additional 20 minutes. Additional THF is added as necessary to control viscosity. Sand is separated, viscosity is adjusted, and magnetic tape is prepared as described in Tape Procedure A.

Stability is determined by following the charge in remanent magnetic flux density of the tapes as measured on ½″-wide tape samples using a DC ballistic-type magnetometer. To obtain meaningful data in a reasonable time, the aging process is accelerated by exposing the tapes to a relative humidity of 50% at 65° C. The stability ($t_{10}$) is reported as the time in days required for a tape to lose 10% of its initial remanent flux density.

Uncoated ferromagnetic $CrO_2$ degrades in tape at a rate dependent upon the particle size and surface area of the oxide, the nature of the dispersants and polymeric binders, the conditions of storage, etc. Thus, a tape made from high surface area, finely divided oxide is less stable than one made from oxide of lower surface area, and a tape prepared with "Alcolec" soya lecithin as dispersant is less stable than one prepared under the same conditions with poly(methyl methacrylate/2-methyl-5-vinyl pyridine) (hereinafter termed PMVP). The effect of particle size upon stability is shown in the following table:

| $CrO_2$ particle size in m.²/g. | Dispersant | $t_{10}$ at 65° C. 50% R.H. |
|---|---|---|
| 14.8 | "Alcolec" | 1.5–2.0 |
| 22.5 | do | 1.1–1.3 |
| 14.8 | PMVP | 15–20 |
| 22.5 | PMVP | 10–13 |

Tape characteristics such as output, $B_r/B_s$ (the fraction of magnetic flux density remaining after applying a 4400-gauss field and then reducing the field to zero) and tape smoothness are not significantly altered by properly applied alumina coatings. The excellent qualities of such tapes are shown in Example 2.

There is listed below and identified by letter the several chromium oxides used in the examples that follow, together with pertinent characterization data for the dry oxide.

| Oxide code | Form | $iH_c$ | $\sigma_s$ | Surface area, m.²/g. |
|---|---|---|---|---|
| A | Wet filter cake | 380 | 82.4 | 14.5 |
| B | Powder | 490 | 83.8 | 22.5 |
| C | do | 370 | 83.1 | 14.8 |
| D | do | 46 | 91.4 | 0.8 |
| E | do | 425 | 78.9 | 23.6 |
| F | Undried synthesis product | 313 | 80.7 | |
| G | Powder | 382 | 82.1 | |

Sodium aluminate was obtained from the Reynolds Metals company and stated to analyze as 42 to 43% $Al_2O_3$. Independent analysis showed 22.7% Al and 22.6% Na. Titration data indicated about 4% strong base (calculated as NaOH) with a neutralization curve midpoint at pH 9.75.

EXAMPLE 1

Wet filter cake (140 g., Oxide A) containing about 65 g. $CrO_2$, 240 g. 20–30 mesh sand and 150 cc. water were placed in a 32 oz. screw-cap jar and vigorously shaken for one hour on a commercial paint mixer. Additional water (200 cc.) was added, and the mixture was shaken for 0.5 hour and stored overnight at about 1–5° C. Solids were reslurried by shaking for 0.5 hour, and sand was separated from the $CrO_2$ slurry by pressure filtration through a 200-mesh wire screen. Additional water (~200 cc.) was added while transferring the filtrate to a 2-liter water-jacketed reactor equipped with a paddle stirrer, a thermometer, pH electrodes and reagent addition funnels.

The $CrO_2$ slurry was heated to 60° C., stirred to provide good mixing, and solutions of 3.0 g. of commercial sodium aluminate in 75 cc. water and 7.0 g. of commercial concentrated nitric acid in 75 cc. water were added simultaneously. The sodium aluminate solution was added at about 0.6 cc./min. and the nitric acid solution at a rate to maintain the pH of the slurry between about 4.7 and 5.0 until about 75% of the aluminate solution had been added, whereupon the pH was allowed to rise gradually to 6.°. Thirty-two cc. of the nitric acid solution was required.

The slurry was digested for 15 minutes at 60° C., cooled and filtered. The filter cake was washed three times by slurrying in water and refiltering. It was then washed by slurrying in acetone and dried, first by drawing air through the filter cake and finally in vacuo over $P_2O_5$, and passed through a 100-mesh screen. The product weighed 56.1 g. Analysis showed 1.12% aluminum, and electron photomicrographs showed that the particles were coated. Surface area by nitrogen adsorption was 22.1 m.²g. compared with 14.5 m.²/g. for the untreated $CrO_2$. In the water test the coated particles developed color equivalent to 7% decomposition in 1000 hours vs. 15% decomposition in 330 hours for the original $CrO_2$.

A portion of the product, which had magnetic properties $H_{cl}/\sigma_s/\sigma_r$ of 380/77.3/34.2 was heated in flowing oxygen at 328° C. for about 19 hours. Magnetic properties after this heat treatment were $H_{cl}/\sigma_s/\sigma_r=350/82.7/36.3$.

When the heat-treated material was placed in magnetic tape with "Alcolec" as dispersant according to Tape Procedure A, the stability, $t_{10}$ was 3.8 days. This is a 3-fold improvement over the starting $CrO_2$ which had a $t_{10}$ of 1.3 days when formulated in tape in the same way.

EXAMPLE 2

A mixture of 70 g. of $CrO_2$ (Oxide B), 160 g. of 20-30 mesh sand and 300 cc. of water was slurried and filtered as in Example 1. The filtered $CrO_2$ slurry was diluted with 500 cc. of water, transferred to a water-jacketed 2-liter reactor, heated to 60° C. with stirring, and sodium aluminate solution (6.0 g. commercial sodium aluminate in 100 cc. $H_2O$) and nitric acid solution (7.0 g. concentrated $HNO_3$ in 150 cc. $H_2O$) were added simultaneously as in Example 1. pH was controlled between 4.7 and 4.9 during precipitation of alumina by adjusting the rates of addition. Toward the end of the addition, pH was allowed to rise to 6.0. At this point all of the aluminate and 122 cc. of the nitric acid solution had been added. Digestion, isolation, washing, and drying were as in Example 1; 64.4 g. of coated $CrO_2$ was obtained.

Analysis of the product showed an Al content of 1.83% and electron photomicrographs indicated substantial coating of the particles. In the water test, 5.5% degradation occurred in 1000 hours compared to 15% degradation in 72 hours for the starting $CrO_2$. Magnetic properties were $H_{cl}/\sigma_s/\sigma_r = 530/76.2/36.0$. After heating in a stream of oxygen at 328° C. for 19 hours, the product had magnetic properties of $H_{cl}/\sigma_s\sigma_r/=475/80.4/38.2$). The heat-treated material was formulated in magnetic tapes according to Tape Procedure A. With "Alcolec" as dispersant, tape stability, $t_{10}$, was 3.1 days. With PMVP as dispersant, $t_{10}$ was 19.0 days. In contrast, untreated $CrO_2$ formulated in the same way had $t_{10}$'s of 1.3 and 12.5 days, respectively.

Alumina-coated $CrO_2$ performs well in magnetic tape as shown by the following additional data in which "Alcolec"-containing tape will be termed Tape A, PMVP-containing tape will be termed Tape B, and the uncoated, control oxide with "Alcolec" as dispersant will be termed Tape $A_{con}$:

| | Tape | | |
|---|---|---|---|
| | A | B | $A_{con}$ |
| Property measured: | | | |
| $H_{ci}$ (A.C. field) | 455 | 455 | 495 |
| $B_r/B_s$ | 0.88 | 0.86 | 0.87 |
| P/W | 34 | 30 | 23 |
| "Talysurf" | 1.0 | 1.5 | 1.4 |
| Output | +4.0 | +0.5 | 0 |

In this table, $H_{ci}$ is the intrinsic coercive force in oersteds. $B_r/B_r$ is the fraction of magnetic flux density remaining after applying a 4400-gauss field and then reducing the field to zero. P/W is the "peak-to-waist" ratio and indicates magnetic loop squareness. A ratio above 20 is a reasonable value. Higher numbers are indicative of improved suitability for use in magnetic tape applications. The P/W ratio is measured on the first time derivative of a hysteresis loop curve generated by a 60 c.p.s. alternating electric field. The derivative curve is available as an oscilloscope display on a standard commercial B/H (e.g., Scientific Atlanta, Model 651B). The P/W value is the ratio of the peak amplitude to waist amplitude at zero field in the derivative curve. The output of a tape can be measured in decibels on a loop transport (e.g., "Ampex" F-44). The reported data were obtained at 30 kc. frequency without bias and are recorded on a relative basis taking Tape $A_{con}$ as 0. A plus number signifies a higher output. "Talysurf" is a measure of surface smoothness of the tapes and is measured on a Taylor-Hobson "Talysurf" instrument. It is reported as the deviation in microinches from a center-line average over a range of 0.01 inch.

The data show that tapes containing alumina coated oxide had nearly the same coercivity and $B_r/B_s$ fraction as the control tape but superior P/W, output and surface smoothness.

EXAMPLE 3

Using the procedure of Example 2, 70 g. of Oxide C was slurried in water, placed in the water-jacketed reactor, stirred and heated to 40° C. A solution of 25 g. of $Al(NO_3)_3 \cdot 9H_2O$ in 100 cc. water was then added over a ten minute period. The pH was then 3.10. To this mixture was added, at about 0.5 cc./min., 75 cc. of a solution of 10 g. NaOH in 100 cc. water, resulting in a pH of 6.0. The slurry was digested for ten minutes at 40° C., and the product was isolated, washed and dried as in Example 1. The product weighed 57.5 g.

Analysis showed an Al content of 1.67%. Surface area was 18.9 m.²/g. compared with 14.8 m.²/g. for the starting $CrO_2$. Electron photomicrographs showed that the $CrO_2$ particles were coated. Magnetic properties were $H_{cl}/\sigma_s/\sigma_r = 385/78/35$. In the water test 1000 hours were required to reach 15% degradation vs. 330 hours for the uncoated oxide.

After the product had been heated in an oxygen stream at 325° C. for 19 hours, it had an $H_{cl}/\sigma_s/\sigma_r$ of 360/81/35. When the heat-treated material was formulated in magnetic tape according to Tape Procedure B, the $t_{10}$ was 9.8 days compared with 4.2 days for the identically formulated uncoated oxide.

EXAMPLE 4

Using the procedure of Example 2, 70 g. of Oxide B was slurried in water, placed in the jacketed reactor, and heated to 40° C. Solutions consisting of (1) 25 g.

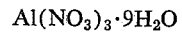

$Al(NO_3)_3 \cdot 9H_2O$ in 80 cc. $H_2O$ and (2) 10 g. NaOH in 100 cc. $H_2O$ were added simultaneously, the nitrate solution at about 1 cc./min. and the hydroxide solution at such a rate that pH was maintained between 4.9 and 5.0. After all of the nitrate solution had been added, the pH was allowed to rise to 6.0. A total of about 82 cc. of the alkali solution was required. After isolation, washing, and drying, the product weighed 73.6 g.

Analysis showed an Al content of 2.19%. Magnetics, $H_{cl}/\sigma_s/\sigma_r$ were 515/74/36. In the water test, the product was degraded 15% in 870 hours compared with 72 hours for uncoated oxide. Electron photomicrographs revealed a surface coating on the $CrO_2$ particles.

After heat treatment in oxygen at 325° C. for about 19 hours, the product had an $H_{cl}/\sigma_s/\sigma_r$ of 490/77/38. Magnetic tape prepared by Tape Procedure B had a $t_{10}$ of 7.2 days compared to 2.1 days for the uncoated oxide. Thus, a three fold improvement in stability was achieved.

EXAMPLE 5

Using the procedure of Example 2, 70 g. of Oxide C was slurried in water, placed in a water-jacketed reactor, heated to 40° C., and pH was adjusted to 10.0 by adding about 2 cc. of 10 weight percent aqueous NaOH. To this mixture was added in about 5 minutes 8 g. of commercial sodium aluminate dissolved in 100 cc. of water. This raised the pH of the slurry of 11.25. Additional water (200 cc.) was added to reduce viscosity. Addition of a solution of 7 g. of nitric acid in 100 cc. of water at about 0.5 cc./min. was continued until the pH of the slurry reached 7.0. The alumina-coated $CrO_2$ was then filtered, washed and dried as previously described. The product weighed 69.6 g.

The product had an Al content of 2.58% and a surface area of 20.2 m.²/g. compared with 15.8 m.²/g. for the original oxide. Magnetic properties, $H_{cl}/\sigma_s/\sigma_r$, were 385/75/35, the material required 800 hours exposure in the water test to reach 15% degradation compared with 330 hours for a control. After heat-treatment in oxygen at 325° C. for 19 hours, the magnetic properties were

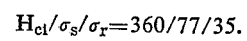

$H_{cl}/\sigma_s/\sigma_r = 360/77/35$.

Magnetic tape prepared using Tape Procedure B had a stability of 8.0 days compared with 4.2 days for similarly prepared tape containing the uncoated oxide.

EXAMPLE 6

Using the procedure of Example 2, 70 g. of Oxide C was slurried, transferred to the water-jacketed reactor and heated to 40° C. To this slurry was added in about five minutes 7.0 g. of sodium hydroxide dissolved in 100 cc. of water. The pH of the slurry was 12.5. A solution of 25 g. of $Al(NO_3)_3 \cdot 9H_2O$ in 100 cc. of water was added at about 0.5 cc./min. until the pH had dropped to 7.0 (94 cc. was required). The coated $CrO_2$ was washed and dried as previously described. The yield was 69.0 g. This material contained 2.06% aluminum, had magnetic properties $H_{cI}/\sigma_s/\sigma_r$ of 385/75/35, and required 800 hours exposure in the water test to reach 15% degradation compared with 330 hours for the starting oxide.

After heat treatment in oxygen at 325° C. for 19 hours the treated $CrO_2$ had magnetic properties $H_{cI}/\sigma_s/\sigma_r$ of 370/78/35. Tape prepared by Tape Procedure B had a stability, $t_{10}$ of 7.8 days vs. 4.2 days for an uncoated control.

EXAMPLE 7

In a one-quart, water-jacketed "Osterizer," 50 g. of Oxide D and 150 cc. of water were blended at high speed for ten minutes. Water (300 cc.) was added while transferring the resulting slurry to a 2-liter water-jacketed reactor, equipped as described in Example 1. The stirred slurry was heated to 40° C. and solutions of 3.0 g. of commercial sodium aluminate in 50 cc. water and of 4 g. concentrated nitric acid in 75 cc. water were added simultaneously. The aluminate solution was added at about 0.6 cc./min. and the nitric acid solution at a rate such that pH was controlled between 4.9 and 5.1. At the end of the reaction, pH was allowed to rise to 6.0. The product was isolated, washed and dried as described previously, and 50.0 g. was recovered.

Analysis showed that 0.2% aluminum was present. The surface area was 2.4 m.²/g. compared with about 0.9 m.²/g. for the starting $CrO_2$. The magnetics were $$H_{cI}/\sigma_s/\sigma_r = 40/90/9$$

When the product was tested in water, 1.3% degradation occurred in 1000 hours compared with about 10% for the original oxide. Thus, large particle $CrO_2$ having low surface area can be stabilized by coating with hydrated alumina.

EXAMPLE 8

In a water jacketed "Osterizer" were placed 30 g. of Oxide C, 500 cc. of water and 4.35 g. of $AlCl_3 \cdot 6H_2O$. Low speed agitation was commenced, and the mixture was heated to 70° C. Blending speed was then raised to the highest level that did not cause splashing, and a solution of 4.05 g. $NH_4Cl$ and 4.5 cc. of concentrated commercial ammonia in 100 cc. of water was added in about 20 minutes. The stirring rate was then reduced, and the slurry was digested for an additional 30 minutes. The product was isolated and washed three times with 100 cc. portions of distilled water and three times with 100 cc. portions of acetone. The product was finally dried overnight at 60° C. at reduced pressure (nitrogen bleed). The recovered weight was 30.3 g.

Analysis showed the presence of 0.34% Al. The surface area was 26.0 m.²/g. and $H_{cI}/\sigma_s/\sigma_r$ was 400/75.8/34.3. The material degraded only about 3% in water in 1000 hours.

A portion of the treated oxide was calcined in a stream of oxygen at 325° C. for 19 hours, whereupon $H_{cI}/\sigma_s/\sigma_r$ became 365/82.3/37.0. Magnetic tape prepared by Tape Procedure B from the upgraded oxide had a stability, $t_{10}$, of 29 days compared with 13 days for an untreated control.

The foregoing examples illustrate the use of alumina as a protective coating for $CrO_2$. They show that the alumina may be applied by a variety of methods to $CrO_2$ of widely different particle size and shape. Although heat treatment of the coated oxide is preferred, such upgrading is not imperative to achieve some degree of stabilization.

The embodiments of the invention in which an exclusive property or privilege is claimed are defined as follows:

1. Ferromagnetic composition consisting essentially of chromium dioxide particles substantially uniformly coated with 1–20% by weight of $Al_2O_3 \cdot xH_2O$ wherein $x$ is 0–3, said particles having a reduced rate of reaction with water and organic materials.

2. The coated particles of claim 1 wherein the said particles have an intrinsic coercive force above 200 oersteds, a saturation induction in the range of 80–100 gauss-cm.³ g. and a remanence ratio of at least 0.35, said ferromagnetic chromium oxide being in the form of highly uniform, fine, acicular particles of a tetragonal crystal structure of the rutile type ranging up to 1.5 microns in length, and having a median axial ratio ranging from 2:1 to 20:1, essentially all of said particles constituting single magnetic domains.

References Cited

UNITED STATES PATENTS

| | | | |
|---|---|---|---|
| 3,535,245 | 10/1970 | Lindquist | 117—234 X |
| 3,512,930 | 5/1970 | Bottjer et al. | 117—234 X |
| 3,507,694 | 4/1970 | Eichler et al. | 252—62.54 X |
| 3,418,161 | 12/1968 | Bauer | 252—62.5 X |
| 3,520,811 | 7/1970 | Swoboda | 117—234 |
| 3,214,379 | 10/1965 | Lindquist | 252—62.54 |

WILLIAM D. MARTIN, Primary Examiner

B. D. PIANALTO, Assistant Examiner

U.S. Cl. X.R.

117—235, 238; 252—62.54